US009917658B2

(12) United States Patent
Hu et al.

(10) Patent No.: US 9,917,658 B2
(45) Date of Patent: Mar. 13, 2018

(54) METHOD, APPARATUS AND COMPUTER PROGRAM FOR TESTING A TRANSCEIVER DEVICE

(75) Inventors: Teck Hu, Melbourne, FL (US);
Thomas Bitzer, Stuttgart (DE);
Henning Martens, Reutlingen (DE);
Kurt Weese, Ditzingen (DE); Thomas Weese, legal representative, Berlin (DE); Martina Weese, legal representative, Groβ Köris (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/387,001

(22) PCT Filed: Mar. 23, 2012

(86) PCT No.: PCT/US2012/030239
§ 371 (c)(1),
(2), (4) Date: Feb. 2, 2016

(87) PCT Pub. No.: WO2013/141873
PCT Pub. Date: Sep. 26, 2013

(65) Prior Publication Data
US 2016/0226601 A1 Aug. 4, 2016

(51) Int. Cl.
*H04B 17/00* (2015.01)
*H04B 7/06* (2006.01)
(Continued)

(52) U.S. Cl.
CPC ............ *H04B 17/00* (2013.01); *H04B 1/40* (2013.01); *H04B 7/06* (2013.01); *H04B 7/0617* (2013.01);
(Continued)

(58) Field of Classification Search
CPC .. H04B 7/0617; H04B 7/0417; H04B 7/0413; H04B 7/0408; H04B 7/0456;
(Continued)

(56) References Cited

U.S. PATENT DOCUMENTS 5,909,460 A * 6/1999 Dent ..................... H01Q 3/26
342/383
8,880,002 B2 * 11/2014 Falck ..................... H01Q 3/24
343/703

(Continued)

FOREIGN PATENT DOCUMENTS

CN 102244549 11/2011
TW 2011-28983 A1 8/2011
(Continued)

OTHER PUBLICATIONS

"3rd Generation Partnership Project; Technical Specification Group Radio Access Network; Evolved Universal Terrestrial Radio Access (E-UTRA); Base Station (BS) conformance testing (Release 11)," 3GPP TS 36.141 V11.0.0, Sections 4.5.7, 6.6.3 and 8.3.1, XP050611662, (Mar. 2012).
(Continued)

*Primary Examiner* — Michelle M Koeth
(74) *Attorney, Agent, or Firm* — Fay Sharpe, LLP

(57) ABSTRACT

Embodiments relate to a concept for testing a transceiver device (302) which may be coupled to an antenna array (312), the antenna array (312) comprising at least two an antenna elements. It is provided (204) spatial radiation characteristics of an antenna reference or the antenna array (312) and at least one antenna element of the antenna array. It is determined (206), based on the spatial radiation characteristics and a predefined test quantity for a spatially unaware receiver or transmitter test of the transceiver device (302), a spatially aware test quantity for testing the transceiver device (302) using the spatially unaware receiver or
(Continued)

transmitter test based on the determined spatially aware test quantity.

17 Claims, 3 Drawing Sheets

(51) Int. Cl.
| | |
|---|---|
| H04B 7/08 | (2006.01) |
| H04B 17/10 | (2015.01) |
| H04B 17/20 | (2015.01) |
| H04B 1/40 | (2015.01) |
| H04W 24/06 | (2009.01) |
| H04W 16/28 | (2009.01) |

(52) U.S. Cl.
CPC .............. H04B 7/08 (2013.01); H04B 17/10 (2015.01); H04B 17/20 (2015.01); *H04W 16/28* (2013.01); *H04W 24/06* (2013.01)

(58) Field of Classification Search
CPC .. H04B 17/0085; H04B 17/391; H04B 17/00; H04B 17/10; H04B 17/20; H04B 7/06; H04B 7/08; H04B 1/40; H04W 24/06; H04W 16/28; H01Q 3/24; H01Q 3/26; H01Q 3/246

See application file for complete search history.

(56) References Cited

U.S. PATENT DOCUMENTS

| | | | |
|---|---|---|---|
| 2004/0204922 A1* | 10/2004 | Beadle | G06K 9/624 |
| | | | 702/189 |
| 2005/0090205 A1* | 4/2005 | Catreux-Erceg | H04B 7/061 |
| | | | 455/78 |
| 2012/0027066 A1* | 2/2012 | O'Keeffe | H01Q 1/246 |
| | | | 375/224 |
| 2012/0071107 A1 | 3/2012 | Falck et al. | |
| 2013/0178203 A1* | 7/2013 | Venkataraman | H04W 4/16 |
| | | | 455/423 |
| 2013/0303080 A1* | 11/2013 | Moreno | H04J 11/004 |
| | | | 455/9 |

FOREIGN PATENT DOCUMENTS

| | | |
|---|---|---|
| WO | WO 99/57820 A1 | 11/1999 |
| WO | WO 03/090386 A1 | 10/2003 |
| WO | WO 2011/023211 A1 | 3/2011 |

OTHER PUBLICATIONS

International Search Report for PCT/US2012/030239 dated Dec. 4, 2012.
Office Action of corresponding Taiwan Application No. 102108109, dated Nov. 25, 2014, 5 pages.

* cited by examiner

METHOD, APPARATUS AND COMPUTER PROGRAM FOR TESTING A TRANSCEIVER DEVICE

Embodiments of the present invention generally relate to wireless communications and, more particularly, to testing transmitters and/or receivers of wireless communication systems used in conjunction with antenna arrays.

BACKGROUND

Demands for higher data rates for mobile services are steadily increasing. At the same time modem wireless communication systems, such as cellular $3^{rd}$ Generation systems (3G), like the Universal Mobile Telecommunications System (UMTS), and $4^{th}$ Generation systems (4G), like Long-Term Evolution (LTE), for example, provide enhanced technologies, which enable higher spectral efficiencies and allow for higher data rates and cell capacities.

One example of such enhanced technologies is the use of multiple antennas at base stations, which may also be referred to as NodeB or eNodeB according to 3GPP ($3^{rd}$ Generation Partnership Project) terminology, and/or at mobile terminals, which may also be referred to as User Equipment (UE). In the context of the present specification base stations and mobile terminals will also be generally termed transceiver device. Multiple antennas at the transmitter and/or receiver side may generally be used for spatial information processing comprising spatial information coding such as spatial multiplexing and diversity coding, as well as beamforming In this context Multiple-Input Multiple-Output (MIMO) technology has attracted attention in wireless communications, because it may offer significant increases in data throughput and link range without additional bandwidth or increased transmit power. This is achieved by spreading the same total power over multiple antennas to either achieve an array gain that improves the spectral efficiency and/or to achieve a diversity gain that improves the link reliability. Because of these properties, MIMO is an important part of modem wireless communication standards, such as LTE, for example.

As one form of smart antenna technology active or passive antenna arrays may be used for beamforming to obtain a highly directive antenna beam, which may be used to advantage in order to improve spectral efficiency and/or in order to mitigate interference. This may be achieved by combining a plurality (i.e. ≥2) of closely-spaced and co-polarized antenna elements of the array in a way where signals at particular spatial directions (angles) experience constructive interference and while others experience destructive interference. The combining may be performed by controlling the signal phases of the various antenna elements, wherein the controlling may be done analog in the Radio Frequency (RF) domain or digitally in the digital baseband domain. In other words, the beamforming may be achieved with a so-called phased array, which is an array of antenna elements in which the relative phases of the respective signals feeding the antenna elements are varied in such a way that the effective radiation pattern of the array is reinforced in a desired direction and suppressed in undesired directions. An antenna array may be linear (i.e. 1-dimensional), planar (i.e. 2-dimensional), or even 3-dimensional. In order to achieve correlated signals between adjacent antenna elements their mutual spacing typically is in the range of λ/2 or more, wherein λ denotes the system center wavelength of the wireless communication system.

In order to test the compliance of antenna arrays with given specifications for a wireless communication system, such as UMTS or LTE, for example, there are two known approaches, each having its own disadvantage:

According to existing 3GPP test specifications (see e.g. 3GPP TS 36.141 V10.5.0), defining RF conducted tests, base station receivers or transmitters, or transceivers to be more general, suitable for antenna array operation have to be coupled to a test port via a splitter or a combiner, depending on the RX (receiver) or TX (transmit) case. Conducted tests are performed by direct injection of one or more RF signals into power, interface and communication cables connected to the Device-Under-Test (DUT). Due to the test principle spatial behavior of the air interface experienced with antenna arrays may not be properly emulated.

FIG. 1a illustrates a test setup 100 a conducted receiver (Rx) test. A base station 102 comprising an Rx antenna interface 106 with a plurality of antenna connectors is coupled to a test input port 108 via a splitting network 104. For each Rx test, the test signals applied to the Rx antenna connectors of the antenna interface 106 shall be such that the sum of the powers $P_i$ of the signals applied equals the power $P_s$ of the test signal(s) specified in the test.

FIG. 1b illustrates a test setup 110 a conducted transmitter (Tx) test. A base station 102 comprising a Tx antenna interface 116 with a plurality of antenna connectors is coupled to a test output port 118 via a combining network 114. For each test, the test signals applied to the Tx antenna connectors of the antenna interface 116 shall be such that the sum of the powers $P_i$ of the signals applied equals the power of the test signal(s) $P_s$ specified in the test. This may be assessed by separately measuring the signals emitted by each antenna connector and summing the results, or by combining the signals and performing a single measurement.

Such RF conducted tests can be carried out with rather low effort. However, if the splitting/combining of the test signals is done with a fixed phase relation between the signals i associated to the single antenna connector (or element), this kind of measurement does not take into account the full spatial behavior of an antenna array, i.e. a radiation or beampattern, which denotes the relative distribution of radiation power as a function of direction (e.g. angle) in space due to beamforming by means of complex beamforming weights, for example. Thus, the compliance with a test specification, e.g. according to 3GPP TS 36.104 V10.5.0, may not fully be proven for spatially aware test scenarios, i.e. scenarios in which wanted and/or unwanted (interfering) signals are meant to be radiated in certain spatial directions. Setting all possible phase relations between the single signals would increase the accuracy but would also increase the test effort significantly.

A method leading to an accurate test of an antenna array and/or the transceiver device coupled thereto which also takes into account the radiation pattern would be the "Over-The-Air" (OTA) test, which takes into account the air-interface. This may be carried out either in an anechoic chamber or in the free field. Here, the electromagnetic field is captured with a probe (test antenna at a certain distance). However, this method leads to significantly higher effort than the aforementioned conducted test with a splitter/combiner. This is a very severe disadvantage especially in performance measurements during mass production of transceiver devices for antenna arrays.

Hence, it is desirable to improve a RF test's meaningfulness and, at the same time, keep the test efforts for mass production or product qualification within reasonable limits

SUMMARY

It is one finding of the present invention to combine both aforementioned test methods in a way that meaningful results can be obtained while limiting the effort in performance measurements during qualification and mass production.

Therefore, embodiments of the present invention propose a two-stage RF test concept. In a first step (antenna validation), spatial radiation properties of the antenna array and individual antenna elements thereof may be provided, for example by means of OTA testing according to specific spatial test scenarios. This antenna validation may be done with one or a few samples (e.g. ≤10) of the antenna array design as it will be reproduced in the mass or high-volume production and/or qualification. In general, the validation may take into account all possible beamforming capabilities of the antenna array and its individual elements. In case that the antenna array is directly coupled to active transceiver elements, a realistic mockup with all passive parts of the antenna array may be used for the OTA validation.

Results of the first step may be transformed into test requirements that can be tested in a subsequent further step. In the further step (validation of single transceivers associated to antenna elements, e.g. during mass production and/or qualification), the inputs/outputs of the transceivers, i.e. the antenna connectors, may be connected to a splitter/combiner, as has been explained with reference to FIGS. 1a, b, and the transceiver performance for a given spatially aware test scenario may be captured by means of a conducted test using the results of the first step. This modified RF conducted test may, for example, be carried out in the mass production or qualification of the antenna arrays and/or the associated transceiver devices, i.e. base stations or mobile terminals.

In other words, according to embodiments of the present invention a spatially aware test scenario, for example comprising an interferer in a certain spatial direction, may be tested with a modified spatially unaware RF conducted test. For this purpose predefined spatially unaware test quantities of the conducted test, such as spatially unaware Tx or Rx power levels defined in compliance test specifications for single antennas or static passive antenna arrays with fixed phase relations among the antenna elements, may be transformed to new, spatially aware test quantities for the conducted test, taking into account the spatial test scenario for adaptive antenna arrays.

According to a first aspect of the present invention it is provided a method for testing transceiver device which may be coupled to an antenna array. The antenna array comprises at least two antenna elements. The method comprises a step of providing spatial radiation characteristics of an antenna reference or the antenna array and spatial radiation characteristics of at least one antenna element of the antenna array. Further, the method comprises a step of determining, based on the spatial radiation characteristics and a pre-defined test quantity for a spatially unaware receiver (Rx) or transmitter (Tx) test of the transceiver device, a spatially aware test quantity for testing the transceiver device using the spatially unaware Rx or Tx test based on the at least one determined spatially aware test quantity.

In other words, at least one predefined spatially unaware test quantity (e.g. a Tx or Rx signal power level of a useful or interfering signal) of a RF conducted test may be transformed into at least one spatially aware test quantity for said RF conducted test by combining the spatial radiation characteristics (or a quantity derived therefrom) with the pre-defined (spatially unaware) test quantity. The term "spatially unaware test quantity" is to be understood as a test quantity that does not take into account varying phase relations between signals corresponding to the individual antenna elements and, hence, varying beampatterns of the antenna array according to different spatial test scenarios. Instead, the predefined spatially unaware conducted test quantity relies on a fixed phase relation between antenna elements, or assumes a single Tx or Rx antenna with no beamforming capabilities. In contrast, the modified spatially aware conducted test quantity is dependent on the spatial test scenario and takes into account a difference between beampatterns of either a reference antenna and the individual antenna elements, or between the whole antenna array and individual antenna elements thereof in a certain spatial direction.

Depending on whether a Tx or Rx test is considered a test quantity may be an input test quantity or an output test quantity of a RF conducted test of the transceiver device. For example, for an Rx test, a test quantity may be an interfering signal mean power or a wanted signal mean power. Instead, for a Tx test, a test quantity may be a (maximum) output power level, for example.

According to some embodiments the transceiver device to be tested may be located in or be coupled to a base station. A base station can be located in the fixed or stationary part of a wireless communication network or system. Thereby the wireless communication system may, for example, correspond to one of the wireless communication systems standardized by the $3^{rd}$ Generation Partnership Project (3GPP), as the Global System for Mobile Communications (GSM), Enhanced Data rates for GSM Evolution (EDGE), GSM/EDGE Radio Access Network (GERAN), Universal Terrestrial Radio Access Network (UTRAN) or Evolved UTRAN (E-UTRAN), Long Term Evolution (LTE) or LTE-Advanced (LTE-A), multistandard radio (MSR) or wireless communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. In the following the terms wireless communication system and mobile communication network may be used synonymously. A base station may correspond to a remote radio head, a transmission point, an access point, a macro cell, a small cell, a micro cell, a femto cell, a metro cell etc. A base station can be a wireless interface of a wired network, which enables transmission of radio signals to a UE or mobile terminal. Such a radio signal may comply with radio signals as, for example, standardized by 3GPP or, generally, in line with one or more of the above listed systems. Thus, a base station may correspond to a NodeB, an eNodeB, a BTS, an access point, etc.

The base station may be coupled to an antenna array comprising a plurality of antennas (i.e. ≥2 antennas).

According to other embodiments the transceiver device to be tested may also be located in or be coupled to a multi-antenna mobile terminal. A mobile terminal may correspond to a smartphone, a cell phone, user equipment, a laptop, a notebook, a personal computer, a Personal Digital Assistant (PDA), a Universal Serial Bus (USB)-stick, a car, etc. Thereby the mobile terminal may be equipped with a plurality of co- or cross-polarized antennas forming an antenna array of correlated or uncorrelated antenna elements. As mentioned before, a mobile terminal may also be referred to as User Equipment (UE) in line with the 3GPP terminology.

Hence, in the present context a "transceiver device" is to be understood as a receiver device, a transmitter device or a device that incorporates both receiver and transmitter functionalities, such as a base station or a mobile terminal for a wireless communication system. Hence, a transceiver device may be a transmitter or a receiver according to some embodiments. However, it may also combine both transmitter and receiver within a common device, which is usually the case for base stations or mobile terminals of wireless communication systems.

For being connectable to an antenna array having a plurality of individual antenna elements the transceiver device to be tested may comprise an antenna interface with a plurality of antenna connectors. Thereby, a number of antenna elements $N_{elem}$ does not necessarily need to correspond to a number $N_{PA}$ of Rx/Tx signal paths or antenna connectors, since there may not be a 1:1 mapping (i.e., $N_{elem}=N_{PA}$) between transceiver elements (comprising Power Amplifiers, PAs) of the transceiver device and antenna elements. Another example is that one antenna connector or transceiver element may be mapped to two or more radiating antenna elements, i.e., $N_{elem}>N_{PA}$. Yet another example, the most general case, is that there is a passive Corporate Feeder Network (CFN) that maps weighted radio signals from the $N_{PA}$ antenna connectors to the $N_{elem}$ antenna elements. Such a feeder network may be expressed by an ($N_{elem} \times N_{PA}$) matrix. With such a feeder network, each antenna connector or the associated transceiver element may be mapped to a certain number of physical antenna elements (some antenna elements might be shared by different power amplifiers when there are combiners in the feeder network). During a RF conducted test each of the $N_{PA}$ transceiver elements of the transceiver device is tested by means of a combiner/splitter network for correct and compliant performance.

According to embodiments of the present invention the antenna array which may be coupled to the transceiver device to be tested is an active antenna array. When using an active antenna array, $N_{PA}$ ($\geq 2$) complete RF transceiver elements, including active devices, such as power amplifiers, may be coupled to $N_{elem}$ ($N_{elem} \geq N_{PA}$) antenna elements of the array. As a consequence, while a passive antenna array requires only one transceiver device, an active array requires multiple transceiver elements, i.e. $N_{PA} \geq 2$. In contrast to passive antenna arrays, the beamforming for active antenna arrays may be done adaptively and digitally in a digital baseband processor coupled to the at least two transceiver elements associated to the active antenna array. Hence, for active antenna arrays a spatial-scenario-specific phase relation between the different signals associated to the individual antenna elements is determined adaptively in the digital baseband domain. This is different for passive arrays, where the phase relation between the different signals is determined in the RF domain outside an associated transceiver device. Moreover, for many passive antenna arrays in present wireless communication systems the beampattern is configured to be static. In other words, constructive or destructive combining of the plurality antenna elements is done outside the transceiver for passive antenna arrays, while it is done inside the transceiver (in the digital baseband domain) for active arrays. This leads to different conducted test quantities for transceivers which are coupled to active antenna arrays (adaptive antenna arrays) compared to transceivers which are coupled to passive arrays with fixed phase relations or even single antennas with a fixed beampattern. However, available test specifications for RF conducted tests do only address fixed phase relations between antenna elements of an antenna array, which may lead to wrong and confusing results when testing transceiver devices which shall be coupled to active antenna arrays and hence perform the beamforming in the digital baseband domain. Embodiments of the present invention may hence provide a mapping between current spatially unaware conducted test specifications designed for fixed phase relations and conducted tests for active arrays and spatial test scenarios.

The step of providing spatial radiation characteristics of the antenna reference or the antenna array and at least one antenna element thereof may comprise the provision of sample data representing the antenna- or beampattern of the whole array, for example in the form of antenna gain values $G_{array}(\phi,\theta)$ depending on a spatial direction defined by angles $\phi$, $\theta$ representing the azimuth and elevation in a spherical coordinate system, for example. Alternatively, data representing the beampattern of a (virtual) reference antenna used for compliance testing may be provided. Further, the step of providing the spatial radiation characteristics may also comprise the provision of sample data representing the antenna-pattern $G_{elem}(\phi,\theta)$ of one or more antenna elements of the array. That is to say, the step of providing also comprises the provision of per-transceiver-antenna-patterns, wherein a per-transceiver-antenna-pattern relates to an antenna pattern that is "seen" by an individual transceiver branch of the transceiver device, the transceiver branch being coupled to one or more antenna element of the array.

For example, after having generated the spatial radiation characteristics for one or more spatial test scenarios, data representing the spatially aware radiation characteristics may be provided by accessing a storage medium, such as a semiconductor memory device or an optical storage (e.g. CD, DVD or Blu-Ray Disc). In some embodiments, the data representing the spatial radiation characteristics (of the array, the individual antenna elements, and/or the reference antenna) may be provided to a radio tester device for testing transmission and/or reception qualities of the transceiver device under test, i.e. the DUT, by means of a modified spatially aware conducted test. As mentioned before, the spatial radiation characteristics may be obtained by prior OTA measurements of the respective antenna- or beampatterns, for example. Hence, the step of providing may also comprise a step of measuring the related spatial radiation characteristics of the antenna array and at least one antenna element thereof.

The step of determining the (at least one) spatially aware test quantity (i.e. test quantity that takes the spatial test scenario into account) may comprise linking the spatial radiation characteristics with predefined or predetermined Rx- or Tx-test-signal-levels, which do not take into account the spatial behavior of the antenna array and/or its individual antenna elements for a given spatial test scenario. That is to say, the predefined or predetermined test signal specifications are independent on spatial-test-scenario-specific antenna gains of the antenna array and the step of determining provides a modification of the predefined and spatially unaware test signal quantities. That is to say, embodiments may enable a spatially aware test of the transceiver device (which may be coupled to the (active) antenna array) by means of a spatially unaware conductor test, typically used for compliance test of RF equipment. For this purpose, a difference between an actual OTA antenna pattern and a per-transceiver-antenna-pattern for a given spatial test scenario may be taken into account for the conducted testing.

According to some embodiments the method may additionally comprise a step of testing the transceiver device with the spatially unaware receiver or transmitter test (RF conducted test) based on the at least one determined spatially aware test quantity, which may be an input or output test quantity (e.g. a signal level) depending on whether an Rx or Tx test of the at least one transceiver device is considered. The testing may, for example, be carried out during mass production or qualification of the antenna array and/or the associated transceiver device, e.g. a base station or a mobile terminal.

According to yet a further aspect of the present invention it is provided an apparatus for testing a transceiver device which may be coupled to an (active) antenna array. The apparatus comprises means for providing spatial radiation characteristics of an antenna reference or the antenna array and at least one antenna element of the antenna array. Further, the apparatus comprised means for determining, based on the spatial radiation characteristics and a predefined test quantity for a spatially unaware (i.e. not aware of a spatial test scenario) Rx or Tx test of the transceiver device, a spatially aware test quantity for testing the transceiver device with the spatially unaware Rx or Tx test based on the determined spatially aware test quantity (i.e. taking into account the spatial test scenario). In some embodiments the apparatus for testing may be incorporated in or coupled to a radio communication tester for testing the compliance of the transceiver device with a certain standardized wireless communication system. That is to say, the apparatus may also comprise means for testing the transceiver device based on the (at least one) spatially aware test quantity.

Some embodiments comprise a digital control circuit installed within the apparatus for performing the method for testing. Such a digital control circuit, e.g. a digital signal processor (DSP) or an Application Specific Integrated Circuit (ASIC), needs to be programmed accordingly. Hence, yet further embodiments also provide a computer program having a program code for performing embodiments of the method, when the computer program is executed on a computer or a digital processor.

Embodiments of the present invention allow to qualify and test transceivers coupled to active antenna arrays with high accuracy (even in the spatial domain) while keeping the effort in the performance measurement during mass production low. Embodiments may provide higher accuracy than if only a conventional conducted test was applied. At the same time embodiments may lead to significantly lower effort in a performance measurement during mass production than if an OTA test was applied all the time.

BRIEF DESCRIPTION OF THE FIGURES

Some embodiments of apparatuses and/or methods will be described in the following by way of example only, and with reference to the accompanying figures, in which FIG. 1a, b show a typical receiver and transmitter test setup according to 3GPP specifications, respectively.

DESCRIPTION OF EMBODIMENTS

Figure 1A:
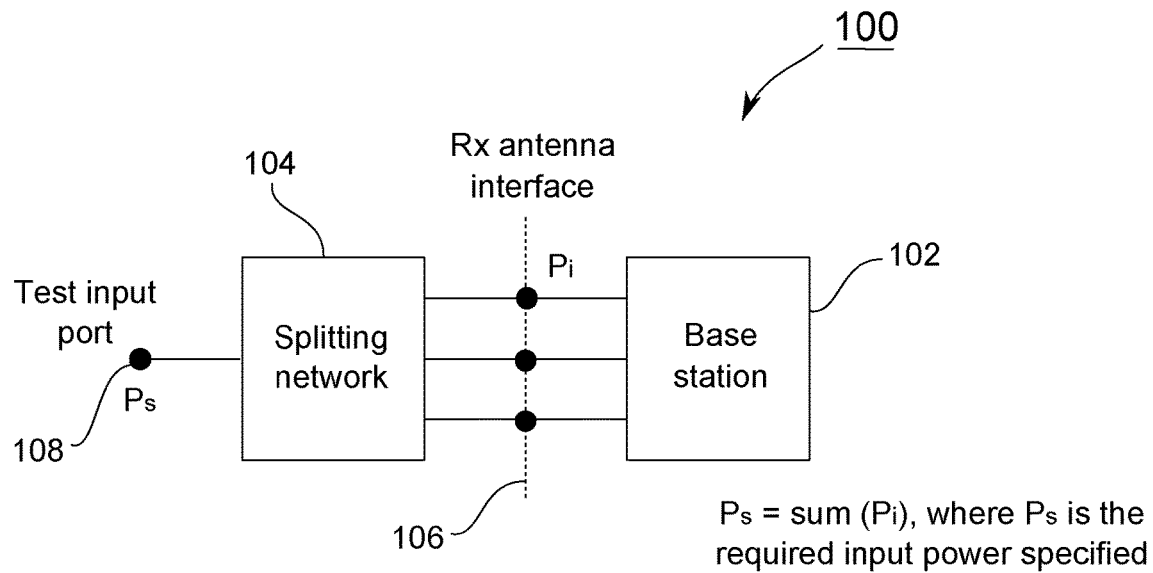

Various example embodiments will now be described more fully with reference to the accompanying drawings in which some example embodiments are illustrated. In the figures, the thicknesses of lines, layers and/or regions may be exaggerated for clarity.

Although embodiments of the present invention will be described referring to a specific conducted receiver test, note that the present invention is not limited to such receiver tests. In the same way, principles of the present invention may be applied to conducted transmitter tests for determining RF characteristics and minimum performance requirements of E-UTRA (evolved UMTS Terrestrial Radio Access Network) base stations, for example.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 2:
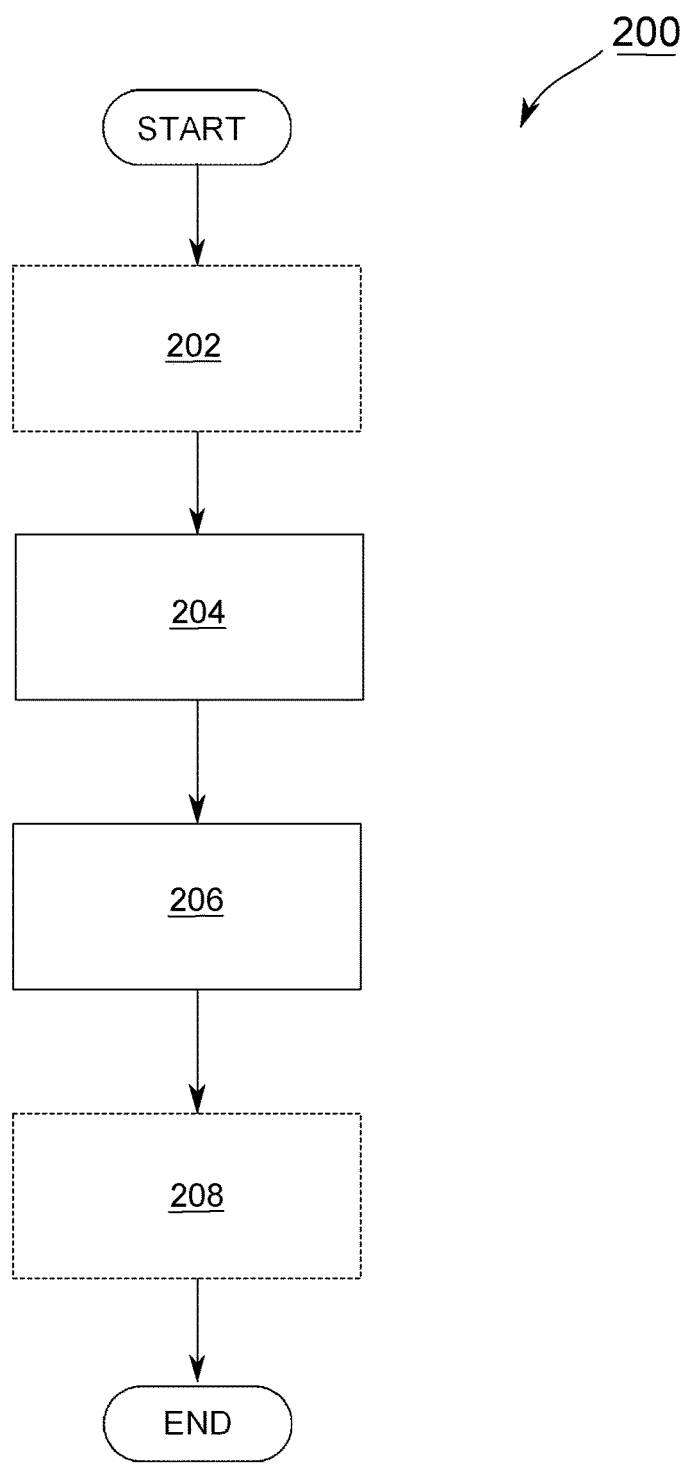
FIG. 2 shows an schematic flow-chart of a method for testing at least one transceiver device, according to an embodiment of the present invention.

FIG. 2 illustrates a schematic flow-chart of an exemplary embodiment of a method 200 for testing at least one transceiver device, e.g. a base station or a mobile terminal, which may be coupled to an active antenna array having $N_{elem}$ antenna elements. That is to say, the antenna array may be an active antenna array which may be coupled to $N_{PA}$ ($\geq 2$) transceivers (transceiver elements) of the transceiver device. That is to say, each of the at least two element transceivers may be coupled to at least one antenna element, e.g. by means of a CFN. Beamforming may be performed by well-known digital beamforming concepts in a digital baseband processor coupled to the at least two element transceivers. This means that phase relations between the antenna elements, and hence the beampattern, are adjusted in the digital baseband processor by applying complex beamforming weights to the respective signals. For the Rx case the adaptive beampattern of the active array is determined in the digital baseband part downstream to an antenna interface, while in the Tx case the adaptive beampattern is adjusted in the digital baseband part upstream to the antenna interface. This is different to single antennas or passive antenna arrays, where beamforming is done in the RF domain.

The test method 200 may comprise a plurality of steps 202, 204, 206, and 208, some of which may be optional.

For example, in an optional initial step 202 spatial radiation characteristics of the active antenna array and at least one individual antenna element thereof may be measured by means of an OTA measurement. Thereby the OTA measurement may be performed in an anechoic chamber or in the free field, for example. During the OTA measurement a 2- or 3-dimensional beampattern $G_{array}(\phi,\theta)$ of the whole antenna array may be obtained for given spatial test scenarios of interest by digital beamforming mechanisms. For example, in one exemplary test scenario an unwanted interferer or a blocker may be assumed in a certain spatial direction, while a desired or wanted user may be placed in another direction. In such a case digital beamforming weights may be obtained that provide a beampattern with a strong main lobe towards the desired user and a weak antenna gain in the direction of the unwanted interferer. Furthermore an antenna- or beampattern of one or more individual antenna elements of the array may, i.e. per-transceiver-antenna-patterns, be measured. If there is foreseen one antenna element per element transceiver, i.e. $N_{elem}=N_{PA}$, beampatterns of an individual antenna elements will be considered. In the special case, the beampattern of an individual antenna element could be omnidirectional, which means that it provides equal gain in each spatial direction. However, for practical antennas this will not be the case.

In a further step 204 the previously measured or determined spatial radiation characteristics of (a reference antenna or) the antenna array and at least one antenna element of the antenna array (all for at least one given spatial test scenario) may be provided to a transceiver test setup for RF conducted testing. For example, the spatial radiation characteristics may be provided from some source to a radio tester device by means of a file transfer and/or a memory lookup. Step 204 may, for example, be performed by a corresponding provision device (or means for providing) of a radio tester apparatus. This provision device may comprise an accordingly configured interface for receiving the spatial radiation pattern data, for example.

In a subsequent step 206 of method 200 it is determined, based on the spatial radiation characteristics and a predefined spatially unaware test quantity for a Rx or Tx conducted test of the transceiver device, a modified spatially aware test quantity for testing the transceiver device with the Rx or Tx conducted test based on the at least one determined spatially aware test quantity. In other words, the (at least one) predetermined spatially unaware test quantity, which may, e.g., be derived from an RF conducted test specification (e.g. 3GPP TS 36.104 V10.5.0), is transformed into a (at least one) spatially aware test quantity which may then be used for conducted testing of the transceiver device (DUT). That is to say, a predetermined test quantity, as e.g. a power level, is modified according to a given spatial test scenario, leading to a modified (spatially aware) new test quantity which may be used for the conducted Rx or Tx test of the transceiver device.

Step 206 may, for example, be performed by a corresponding processing device (or means for determining) of a radio tester apparatus. This processing device may comprise accordingly programmed digital determining circuitry, for example.

A further optional step 208 of method 200 comprises testing the at least one transceiver device (e.g. of a base station or a mobile terminal) using the conventional (spatially unaware) conducted Rx or Tx test, but now based on the newly determined (modified) spatially aware test quantity, which has been modified according to the spatial test scenario starting from the predetermined (spatially unaware) test quantity. For example, this test step 208 may be carried out during mass production or qualification of base stations or mobile terminals. In this way it may be ensured that produced communication devices are compliant to a certain version of the respective wireless communications standard, such as, for example, an UMTS or LTE standard.

As has been mentioned before, embodiments of the present invention may be particularly useful in conjunction with active antenna arrays, which may be used for adaptive digital beamforming in accordance to certain defined spatial test scenarios. An active antenna array may be coupled to at least two ($N_{PA}$) elementary transceivers of the transceiver device, wherein each of the at least two elementary transceivers may be coupled to at least one antenna element of the antenna array. Beamforming of the active antenna array for a spatially aware test scenario is then performed in a digital baseband processor coupled to the at least two elementary transceivers. That means for the Rx case, for example, that the individual antenna elements will provide an Rx input power to the associated elementary transceivers, which does not correspond to the antenna gain of the whole array in a given spatial direction, but which corresponds to the antenna gain of one or more individual antenna elements in said direction, i.e., which corresponds to the respective per-transceiver-antenna-pattern. Hence, the spatial radiation characteristics of the whole array as well as the per-transceiver-antenna-pattern may be provided for one or more spatially aware test scenarios, in which undesired users and wanted users may be placed at certain locations, leading to scenario-specific beampatterns $G_{array}(\phi,\theta)$ of the whole antenna array. In contrast, the per-transceiver-antenna-patterns $G_{elem}(\phi,\theta)$ will not be dependent on the spatial scenario or setup. Generally, the beampatterns $G_{array}(\phi,\theta)$ of the whole antenna array will be different from the per-transceiver-antenna-patterns $G_{elem}(\phi,\theta)$ for a spatial test scenario.

In the following, a particular exemplary embodiment of the present invention will be explained based on the example of the requirement of receiver blocking. Thereby a receiver's blocking characteristics is a measure of the receiver's ability to receive a wanted signal at its assigned channel in the presence of an unwanted interferer, which may either be a 1.4 MHz, 3 MHz or 5 MHz E-UTRA signal for in-band blocking or a Continuous Wave (CW) signal for out-of-band blocking, for the exemplary case of LTE.

In this spatially unaware conducted Rx test, which is defined for LTE e.g. in 3GPP TS 36.104 V10.5.0, section 7.6, the capability of a receiver device to receive a weak wanted or desired signal in the presence of a large interferer (blocker) has to be proven. When testing a "classic" receiver design, where one receiver is connected to a passive antenna array and where the combination of the signals received by the individual antenna elements is done in the RF domain before feeding them to the receiver input, a wanted signal and a blocker signal have to be applied simultaneously at the antenna connector at a certain power level that is defined in the respective standard. For LTE, the blocker power level is defined to be −43 dBm at the antenna connector, which is schematically illustrated in FIG. 3.

Figure 3:
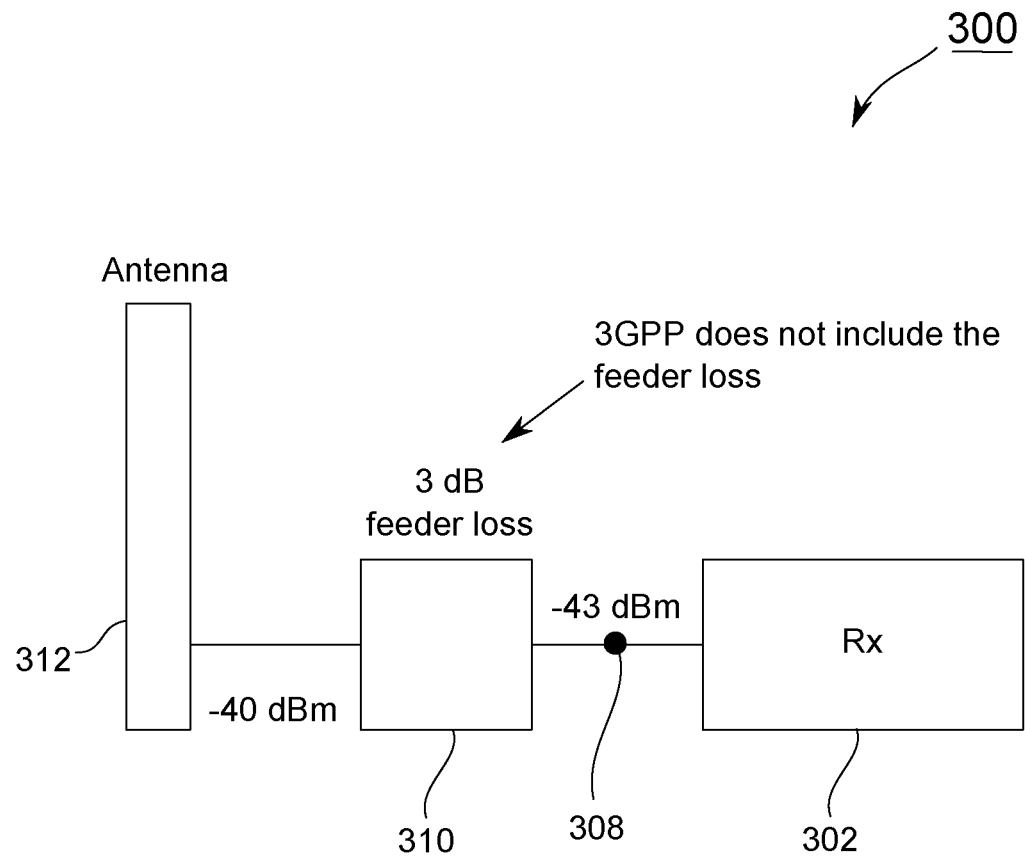
FIG. 3 shows a blocking test setup for a receiver device.

FIG. 3 shows a conducted test setup 300 with a transceiver device in form of a receiver 302. Note that according to other embodiments the receiver device 302 could also be a transmitter device, hence, a transceiver device in general. At a test port 308 associated to the receiver 302 the spatially unaware blocker power level is defined to be −43 dBm. If the receiver 302 shall be used with an active antenna array 312, a CFN 310 will be used to couple the receiver device 302 to the array 312. That is to say, at least one antenna connector of the transceiver device 302 may be coupled to a feeder network 310 in order to connect the antenna array 312 to the transceiver device 302. The feeder network 310 may comprise cables and other entities leading to a loss of the feeder network. However, in the spatially unaware blocker power level a loss of the feeder network 310 between an antenna array 312 and the receiver device 302 is not taken into account. Note, however, that the feeder network 310 and the antenna array 312 will not be present for a spatially unaware conducted test of the receiver device 302. Assuming an exemplary feeder loss of 3 dB, this leads to a modified blocker power level of −40 dBm at test port 308.

In the field, i.e. in a spatially aware test scenario, a blocking signal could be received from a certain spatial direction where the antenna array 312 has a certain antenna gain $G_{array}(\phi,\theta)$. In the following, let us assume that the antenna gain in this given spatial direction is about 3 dBi. "dBi" is used rather than just "dB" to emphasize that this is the gain according to the basic definition, in which the antenna is compared to an isotropic radiator. Let us further assume that a single antenna element of the respective antenna array 312 has a gain in the same direction of about 5 dBi. Note that a single antenna element or a group of antenna elements of an antenna array has typically higher gain in "unwanted directions" than the whole antenna array. Taking into account an antenna element gain that is 2 dB higher in the spatial direction of the unwanted blocking signal, this means that an elementary receiver associated to the respective antenna element of the active array has to deal with a blocker power level which is 2 dB higher as mentioned before. For this reason the predefined spatially unaware blocker power level has to be adapted to the spatial test scenario to obtain a new, spatially aware blocker power level for the conducted RF test. Note that no receive beamforming is performed in the RF domain (prior to an antenna connector) when considering active antenna arrays.

All in all, an elementary receiver or a receiver element associated an antenna element of the active array has to process a new, spatially aware blocker power level which may be given by:

value of the new spatially aware blocker power level (dBm)=value of the existing spatially unaware blocker power level (dBm)+feeder loss (dB)+ higher gain of the antenna element in the direction of the blocking signal (dB), (1)

wherein in the present example "value of the existing spatially unaware blocker power level" is the blocker power level of −43 dBm as a spatially unaware test quantity, the feeder loss is 3 dB, and the "higher gain of the antenna element in the direction of the blocking signal" denotes an antenna gain difference, or an absolute value thereof, between a radiation pattern of the whole antenna array and a per-receiver-antenna-pattern in the spatial direction of the interferer (blocker). That means, that either one of the steps 204 or 206 may comprise obtaining, for at least one spatial direction, a difference (or an absolute value thereof) between a radiation pattern of the whole antenna array and a radiation pattern of at least one antenna element thereof. In other words, a difference between the actual OTA antenna pattern and the per-transceiver-antenna-pattern may be accounted for during conducted testing, which means that step 206 may comprise, for a given spatial transceiver test scenario, determining a difference between a radiation pattern of the antenna array 312 and an individual radiation pattern of at least one antenna element associated to one of the at least two elementary transceivers and using said difference for determining the spatially aware test quantity from the predefined test quantity.

When regarding the blocking test example, it becomes apparent that for the step 206 of determining the at least one spatially aware test quantity, at least one antenna gain difference (e.g. 5 dBi−3 dBi=2 dB) for the spatial test scenario may be combined with a predetermined test signal level (e.g. −43 dBm) at a test port 308 of the at least one transceiver device 302. Thereby the predetermined spatially unaware test signal level (i.e. −43 dBm in the exemplary case) may correspond to a fixed phase relation between the antenna elements of the antenna array. That is to say, the predetermined test signal level of −43 dBm may either assume a passive antenna array combining its antenna elements with a fixed phase relation in the RF domain before the antenna connector or a single receive antenna which is not capable of beamforming at all. In other words, the conventional conducted test simply assumes the reception of the interferer with a signal power level of −43 dBm, unaware of any spatial setups or beamforming However, if digital beamforming is applied in the Rx device 302 to be tested, the Rx device 302 will comprise more than one elementary receiver. Instead, it will comprise $N_{PA}$ elementary receiver branches, wherein each receiver branch may be coupled to only one antenna element or a subgroup of antenna elements of the array 312. Therefore each receiver branch of the Rx device 302 will experience its individual (not yet combined) received signal of its associated antenna element, which is e.g. 5 dBi−3 dBi=2 dB larger than the composite signal after digital beamforming has been performed. Hence, each individual antenna-element-specific transceiver of the Rx device 302 has to be fed with a larger (by 2 dB in the example) signal power level in order to obtain comparable results to the "classical" spatially unaware receiver test. According to some embodiments the at least one antenna gain difference, or the absolute value thereof, may be added to the pre-determined spatially unaware test signal level (e.g. −43 dBm) to obtain the spatially aware test signal level. As can be seen from above Eq. (1) determining the at least one spatially aware test quantity (e.g. blocker power level) may additionally comprise accounting for an insertion loss of a feeder network 310, which is typically used in the field in conjunction with an active or a passive antenna array. According to embodiments an absolute value of the insertion loss may be added to the predetermined spatially unaware test signal level to obtain the spatially aware test signal level. However, this insertion loss may be also already be (implicitly) accounted for in the provided OTA data.

Now assume that the Rx device 302 under test comprises $N_{PA}$ individual receiver elements associated to $N_{elem}$ antenna elements of an active antenna array, with $N_{elem} \geq N_{PA}$.

Figure 1B:
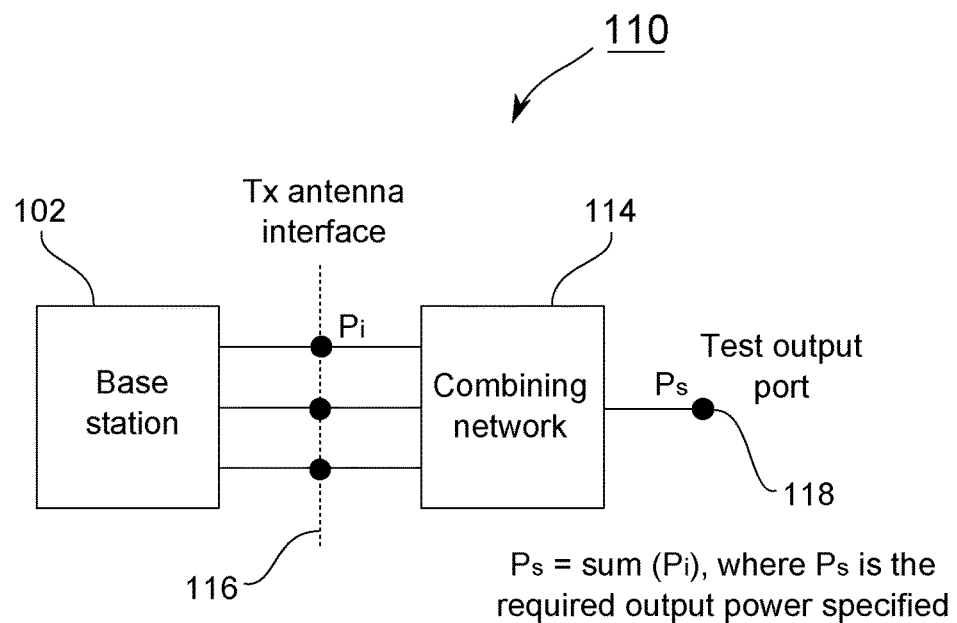

If, for conducted testing, the $N_{PA}$ individual receiver elements are connected to a splitter network 104, as shown in FIG. 1 a, the required power level of the spatially aware blocking signal which has to be inserted at the splitter input 108 has to be increased further by 10 log ($N_{PA}$) dB. Hence, according to some embodiments the value of the new spatially aware test quantity may be determined according to value of the new spatially aware test quantity
(dBm)=value of the existing spatially unaware
test quantity (dBm)+feeder loss (dB)+higher
gain of the antenna element in the direction of
the blocking signal (dB)+10 log ($N_{PA}$) (dB)     (2)

To summarize, one or a few samples of an antenna array may be validated regarding the pattern of the single antenna elements (or groups of elements) and the pattern of the whole array, according to embodiments. That is to say, the spatial radiation characteristics may be provided for a limited number (e.g. ≤10) of antenna arrays of the same antenna array layout to obtain spatial radiation characteristics averaged over the limited number of antenna arrays of the same antenna array layout. This may be done before mass production or qualification. The gain difference between these patterns in each interesting direction may be determined. In a next step, the power level of a predefined conducted Rx or Tx test quantity, as given by 3GPP conducted test requirements, for example, may be increased (or decreased) by this gain difference and a known feeder loss. In addition, the loss of the splitter network used for testing is taken into account and also added to the power level of the predetermined test quantity to obtain a new spatially aware test quantity for testing a transceiver device being capable of digital beamforming With this new test quantity or power level, the respective receiver or transmitter test may then be carried out in a conducted way using a splitter or combiner in the performance measurement, which may take place e.g. in mass production of the transceiver device.

Embodiments can be applied generally to prove the compliance with many requirements. A clear advantage of embodiments is given regarding the "ease of use": If every active antenna was to be measured over the air, this would lead to a very long measurement time (the antenna array has to be mounted on a rotor and turned in a high number of azimuth and elevation angles) which in turn leads to high costs. That also means that quick qualifications of the transceiver part in the lab are no more possible. Every time, the compliance with a requirement needs to be tested, the active antenna would have to be shipped to a test site or anechoic chamber and measured in many azimuth and elevation angles. On the other side, if the radiation pattern of the antenna elements is known and the resulting requirement for the transceiver part is calculated (as outcome of post-processing), it may be rather easy to test in the lab with combiners.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . ." (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A method for testing a transceiver device configured to be coupled to an antenna array, the antenna array comprising at least two antenna elements, the method comprising:
    providing spatial radiation characteristics of:
        an antenna reference or the antenna array; and
        at least one antenna element of the antenna array; and
    determining, based on the spatial radiation characteristics and a predefined spatially unaware power level for a spatially unaware receiver or transmitter test of the transceiver device, a spatially aware power level for testing the transceiver device using the spatially unaware receiver or transmitter test based on the determined spatially aware power level;

wherein the transceiver device comprises at least two transceivers which are associated to at least two antenna elements of the antenna array, wherein the spatial radiation characteristics comprise individual radiation patterns of antenna elements associated to the at least two transceivers, and wherein determining the spatially aware power level comprises:

determining a difference in a certain spatial direction between a radiation pattern of the whole antenna array and an individual radiation pattern of at least one antenna element associated to one of the at least two transceivers, wherein the certain spatial direction is a direction of an interferer; and using said difference for determining the spatially aware power level from the predefined spatially unaware power level.

2. The method of claim 1, wherein providing the spatial radiation characteristics of the antenna array and the at least one antenna element thereof comprises providing said spatial radiation characteristics for a predefined spatial receiver or transmitter test scenario.

3. The method of claim 2, wherein providing the spatial radiation characteristics of the antenna array and the at least one antenna element thereof comprises digital beamforming of a beampattern of the antenna array for the predefined spatial receiver or transmitter test scenario in a digital baseband processor coupled to the transceiver device.

4. The method of claim 1, wherein providing the spatial radiation characteristics comprises obtaining radiation pattern data based on an Over-The-Air measurement of a radiation pattern of the antenna array and a radiation pattern of at least one individual antenna element.

5. The method of claim 1, wherein providing the spatial radiation characteristics comprises obtaining, for at least one spatial direction, an antenna gain difference, or an absolute value thereof, between the radiation pattern of the whole antenna array and a radiation pattern of at least one antenna element thereof.

6. The method of claim 1, wherein the spatial radiation characteristics are provided for a limited number of antenna arrays of the same antenna array layout to obtain spatial radiation characteristics averaged over the limited number of antenna arrays of the same antenna array layout.

7. The method of claim 5, wherein, for determining the spatially aware power level, at least one antenna gain difference is combined with a predetermined test signal level at a test connector associated to the transceiver device, wherein the predetermined test signal level corresponds to a fixed phase relation between the antenna elements of the antenna array.

8. The method of claim 7, wherein the at least one antenna gain difference, or the absolute value thereof, is added or subtracted to the predetermined test signal level to obtain a spatially aware test signal level.

9. The method of claim 1, wherein an antenna connector of the transceiver device is configured to be coupled to a feeder network or cable for coupling the transceiver device to the antenna array, and wherein determining the spatially aware power level comprises accounting for an insertion loss of the feeder network or cable and a number of input signals to the feeder network.

10. The method of claim 9, wherein the insertion loss and a correction value depending on the number ($N_{PA}$) of transceiver paths in the transceiver device are added to a predetermined test signal level at a test connector associated to the transceiver device.

11. The method of claim 1, wherein the predefined spatially unaware power level is related to an interfering signal present at a test connector associated to the transceiver device, the interfering signal having a predefined interfering signal power level.

12. The method of claim 1, further comprising:

testing the transceiver device using the spatially unaware receiver or transmitter test based on the determined spatially aware power level, wherein the spatially unaware receiver or transmitter test is a radio frequency conducted test.

13. The method of claim 1, wherein the method is performed by executing a computer program having a program code by a computer or processor.

14. An apparatus configured to test a transceiver device configured to be coupled to an antenna array, the antenna array comprising at least two antenna elements, the apparatus comprising:

a provider configured to provide spatial radiation characteristics of:
an antenna reference or the antenna array; and
at least one antenna element of the antenna array; and a determiner configured to determine, based on the spatial radiation characteristics and a predefined spatially unaware power level for a spatially unaware receiver or transmitter test of the transceiver device, a spatially aware power level for testing the transceiver device;

wherein the transceiver device comprises at least two transceivers which are associated to at least two antenna elements of the antenna array, wherein the spatial radiation characteristics comprise individual radiation patterns of antenna elements associated to the at least two transceivers, and wherein the determiner is configured to determine the spatially aware power level by:

determining a difference in a certain spatial direction between a radiation pattern of the whole antenna array and an individual radiation pattern of at least one antenna element associated to one of the at least two transceivers, wherein the certain spatial direction is a direction of an interferer; and using said difference for determining the spatially aware power level from the predefined spatially unaware power level.

15. The method of claim 1, wherein the predefined spatially unaware power level for the spatially unaware receiver or transmitter test comprises a transmit or receive power level of a single antenna of the antenna array.

16. The method of claim 1, wherein the determining of the spatially aware power level is further based on a feeder loss and a higher gain of an antenna element in a direction of a blocking signal.

17. The method of claim 1, wherein the spatially unaware power level is a spatially unaware blocker power level, and the spatially aware power level is a spatially aware blocker power level.

* * * * *